3,135,777
PROCESS FOR PREPARING ORGANOSILICON COPOLYMERS
John M. Nielsen, Schenectady, N.Y., assignor to General Electric Company, a corporation of New York
No Drawing. Filed Aug. 28, 1961, Ser. No. 134,086
6 Claims. (Cl. 260—448.2)

The present invention relates to a process for making fluid copolymers, suitable for high temperature service, composed of intercondensed organosiloxane units and silylarylenesiloxane units.

Methods have been sought to copolymerize silylarylenesiloxane units formed by hydrolyzing bis-(diorganohalosilyl) aromatic hydrocarbons having the formula:

(1) 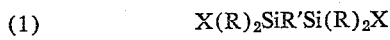  X(R)$_2$SiR'Si(R)$_2$X described in Patent 2,561,429, Sveda, with organosiloxane units formed by hydrolyzing organohalosilanes having the formula:

(2)   (R)$_n$SiX$_{4-n}$ to produce fluid poly(silylarylenesiloxane) copolymers suitable for high temperature service, where R' is an arylene radical, R is a monovalent hydrocarbon radical and a halogenated monovalent hydrocarbon radical, $n$ is an integer equal to from 1 to 3, inclusive, and X is a halogen radical.

Procedures commonly employed for the production of conventional fluid copolymers of alkylsiloxane units and arylsiloxane units by standard hydrolysis of a mixture of the corresponding alkyl halosilanes and arylhalosilanes such as described in Rochow, Chemistry of the Silicones, 2nd edition, (1951) John Wiley and Sons, New York, have been found to be unsatisfactory for the hydrolysis of a mixture of compounds of Formulae 1 and 2. Experience has shown for example, that if the compounds of Formulae 1 and 2 are cohydrolyzed in accordance with the aforementioned procedure, the copolymer products derived from the resulting cohydrolyzates are highly crystalline and lack utility.

As used hereinafter, the term "cohydrolyzate" will signify the product produced by hydrolyzing compounds of Formulae 1 and 2 together in any one of a variety of ways at a temperature in the range of 0° to 100° C. For example, compounds of Formula 1 can be hydrolyzed separately from compounds of Formula 2 and the respective hydrolysis products can be mixed together. The cohydrolyzate can also be formed by simultaneously hydrolyzing compounds of Formulae 1 and 2 in the form of a mixture, or by simultaneously introducing compounds of Formulae 1 and 2 into a hydrolysis mixture from separate sources. Again, any one, or a combination of the aforementioned procedures can be employed such as hydrolyzing compounds of Formula 1 with one or more compounds of Formula 2 either simultaneously or separately. The cohydrolyzate in accordance with the aforementioned description, is therefore a heterogeneous mixture of intercondensed silylarylenesiloxane units and organo-substituted siloxane units having uncondensed silanol radicals. In hydrolyzing the compounds of Formulae 1 and 2 together or separately to form the cohydrolyzate, in accordance with conventional procedures, opportunities for the respective silylarylenesiloxane units and organo-substituted siloxane to be randomly intercondensed to provide for a maximum degree of distribution of these units in the copolymer are not usually present. The copolymer product derived from the cohydrolyzate without further processing therefore tends to be highly crystalline. One possible explanation is that the organo-substituted siloxane units intercondensed separately from the silylarylenesiloxane units forming undesirable blocks in the copolymer.

A method that can be employed to reduce the crystallinity of copolymers formed by cohydrolyzing compounds of Formulae 1 and 2 is to acid equilibrate the cohydrolyzate. As is known by those skilled in the art, equilibration of the cohydrolyzate can provide for a redistribution of the silylarylenesiloxane units and organo-substituted siloxane units in the copolymer, whereby silylarylenesiloxane blocks and organo-substituted blocks are broken down. For example, in the copending application of Norman G. Holdstock, Serial No. 780,259 filed December 15, 1958, now abandoned, and its continuation-in-part application, Serial Number 159,422, filed Dec. 14, 1961, now U.S. Patent No. 3,117,149, granted Jan. 7, 1964, and assigned to the same assignee as the present invention, certain unsymmetrical poly(silylarylenesiloxane) fluid copolymers and a method for making them are described. These copolymers are made by cohydrolyzing compounds within the scope of Formulae 1 and 2 and acid equilibrating the cohydrolyzate.

Although the aforesaid acid equilibration method can be employed for the production of a variety of valuable fluid copolymers suitable for high temperature service by effecting the rearrangement and intercondensation of the respective organosiloxane units and silylarylenesiloxane units, experience has shown that direct acid equilibration of the cohydrolyzate derived from compounds of Formulae 1 and 2 results in the production of undesirable amounts of volatile products. During the acid equilibration of the aforedescribed cohydrolyzate, silylarylenesiloxane units are degraded to a substantial degree by what is believed to be the following reaction (3)

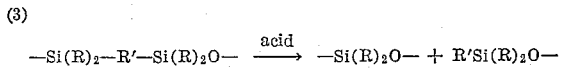

—Si(R)$_2$—R'—Si(R)$_2$O— $\xrightarrow{\text{acid}}$ —Si(R)$_2$O— + R'Si(R)$_2$O— where R and R' are as defined above. The more expensive silylarylenesiloxane units, derived from the compounds of Formula 1, are converted or lost to as high as 60% by weight as shown above in Equation 3 to low molecular weight volatiles in the form of diorganosiloxane units and triorganosiloxane chainstopping units, respectively, by what is referred to as "silarylene cleavage." In addition, experience has demonstrated that as a result of excess silarylene cleavage, the viscosity of the resulting copolymer can be reduced considerably, making it difficult to control or predict the final copolymer viscosity.

The present invention is based on the discovery that if a mixture of compounds of Formulae 1 and 2 is hydrolyzed and the resulting cohydrolyzate is heated to a temperature up to 250° C. in the presence of a trace amount of a base catalyst, the resulting product referred to hereinafter as the "condensation product" can be acid equilibrated without a substantial amount of silarylene cleavage taking place to produce fluid copolymers having a reduced tendency to crystallize.

In accordance with the present invention, there is provided a process for the production of copolymers of intercondensed silarylenesiloxane units and organo-substituted siloxane units having a viscosity of 50 centistokes to 10,000 centistokes at 25° C. comprising (A) forming a cohydrolyzate composed of silylarylenesiloxane units and organo-substituted siloxane units in a molar ratio of one mole of silylarylenesiloxane units having the formula:

(4) $\quad$ —$(R)_2SiR'Si(R)_2O$—

0.5 to 4 moles of diorganosiloxane units having the formula:

(5) $\quad$ $(R)_2SiO$ 0 to 0.1 mole of organosiloxane units having the formula:

(6) $\quad$ $(R)SiO_{3/2}$ and 0 to 0.5 mole of triorganosiloxane units having the formula:

(7) $\quad$ $(R)_3SiO_{1/2}$ (B) heating to a temperature up to 250° C. a mixture of said cohydrolyzate of (A) and 0.001 to 2 percent based on the weight of said mixture of a base catalyst, (C) acid equilibrating the product of (B), and (D) stripping the product of (C), where R and R' are as defined above.

Radicals included by R of the above formulae are, for example, aryl and haloaryl radicals, e.g., phenyl, chlorophenyl, tolyl, naphthyl, biphenyl, etc. radicals; aralkyl radicals, e.g., benzyl, phenylethyl, etc. radicals; alkyl radicals, e.g., methyl, ethyl, propyl, butyl, octyl, etc. radicals; alkenyl radicals, e.g., vinyl, allyl, etc. radicals; cycloalkyl radicals, e.g., cyclohexyl, cyclopentyl, etc. radicals; cycloalkenyl radicals, e.g., cyclohexenyl, cycloheptenyl, etc. radicals. Radicals included by R' of Formulae 1 and 4 are phenylene, naphthalene, tolylene, biphenylene, etc. radicals. It is preferred that R radicals present in the compositions of any of the preceding formulae be the same. However, it should be understood that within the scope of the present invention are compositions in which the various R radicals are different. Likewise, it is preferred that all of the R' radicals be the same, but mixtures of various R' radicals can be present in any composition employed in the practice of the present invention. Among the radicals represented by X are chloro, bromo, iodo, etc. radicals. The various halogen radicals represented by X can also be the same or different radicals in the same composition. Preferably, the process of the present invention employs compositions in which R is methyl and phenyl, R' is phenylene and X is chlorine or a mixture of chlorine and bromine.

The bis-substituted diorganohalosilyl aromatic hydrocarbons of Formula 1 can be prepared in accordance with the procedure shown in Patent 2,561,429, Sveda. A host of products within the scope of Formula 1 can be formed by reacting a dihalo-substituted aromatic hydrocarbon such as p-dichlorobenzene, p-dibromobenzene, 1,4-dibromonaphthalene, 2,7-dibromonaphthalene, 1,4-dibromo-2-methylbenzene, etc. with diorganodihalogenosilane (8) $\quad$ $(R)_2SiX_2$ such as dimethyldichlorosilane, diethyldichlorosilane, methylcyclohexyldichlorosilane, methylvinyldichlorosilane, methylphenyldichlorosilane, diphenyldichlorosilane, etc. where R and X are as defined above. Among the bis-substituted diorganohalosilyl aromatic hydrocarbons within the scope of Formula 1 which are prepared by reacting ingredients of the above type in accordance with the process of Patent 2,561,429, Sveda, are, for example, 1,4-bis-(dimethylchlorosilyl)benzene; 1,3-bis-(dimethylchlorosilyl) benzene; 1,4-bis-(dimethylchlorosilyl)naphthalene; 2,7-bis-(dimethylchlorosilyl)naphthalene; 1,4-bis-(diethylbromosilyl)-2-methylbenzene; etc. Organohalosilanes included in Formula 2, in addition to the diorganodihalosilanes of Formula 8 are organotrihalosilanes (9) $\quad$ $RSiX_3$ such as methyltrichlorosilane, phenyltrichlorosilane, etc., and triorganohalosilanes

(10) $\quad$ $(R)_3SiX$ such as dimethylphenylchlorosilane, trimethylchlorosilane, and diphenylmethylchlorosilane, etc. where R and X are as defined above.

In the practice of the invention, a cohydrolyzate of a bis-(diorganohalosilyl) aromatic hydrocarbon of Formula 1 and organohalosilanes of Formula 2 is formed; the cohydrolyzate is mixed with a base catalyst and the mixture is heated to effect the condensation of silanols of the cohydrolyzate and removal of the last traces of water therefrom; the condensation product produced thereby is then acid equilibrated and stripped.

In forming the cohydrolyzate, it has been found expedient to employ an organic solvent in view of the low solubility characteristics of the bis-(diorganohalosilyl) aromatic hydrocarbon. A suitable organic solvent is an organic solvent that facilitates the formation of the cohydrolyzate and is substantially inert to the reactants. Suitable organic solvents include, toluene, xylene, benzene, cyclohexane, dioxane, etc.

Although the temperature employed during the hydrolysis is not critical, it is preferred to conduct the hydrolysis at a temperature in the range of 60° to 100° C. Temperatures in the range of between about 85 to 100° C., moreover, are particularly preferred. A temperature as low as 0° C. can be employed, however, for effective results.

In order to promote a degree of rearrangement and intercondensation between silylarylenesiloxane units and organosiloxane units during the hydrolysis, while at the same time minimizing silarylene cleavage, it has been found advantageous to conduct the hydrolysis under basic conditions, i.e., a pH above 7 while a pH between 8 and 13 is preferred. However, the hydrolysis can be conducted under acid conditions, i.e., at a pH within the range produced by normal hydrolysis in the absence of base without excessive silarylene cleavage occurring. In the event the hydrolysis is conducted under basic conditions, any one or more of a variety of conventional bases can be employed to maintain the basicity of the hydrolysis mixture. A preferred procedure is to utilize an alkali hydroxide to neutralize the hydrolysis acid formed during the hydrolysis along with a sufficient amount of ammonium hydroxide or suitable ammonium salt to maintain the proper basicity of the resulting hydrolysis mixture. Included among the bases that can be advantageously employed in the practice of the invention to maintain a pH above 7 during hydrolysis are alkali hydroxides such as sodium hydroxide, potassium hydroxide, lithium hydroxide, etc., alkali and alkaline earth carbonates and acid salts thereof, such as calcium carbonate, sodium carbonate, sodium bicarbonates, etc. In addition, ammonium salts such as ammonium chloride, ammonium sulfate, ammonium carbonate, etc., can be employed with any one of the aforementioned alkali hydroxides in place of ammonium hydroxide.

At the completion of the hydrolysis, the cohydrolyzate can be separated from the hydrolysis mixture in accordance with conventional means such as gravity separation. Where ammonium hydroxide or salt thereof has been utilized during the hydrolysis, it has been found desirable to eliminate residual nitrogen compounds from the cohydrolyzate before the cohydrolyzate is treated further. A convenient method is to add an aqueous solution of base such as any one of the aforementioned alkali hydroxides to the cohydrolyzate, followed by heating the resulting mixture to distill out the ammonia. The cohydrolyzate can then be separated from the remaining aqueous layer containing excess alkali by conventional means such as gravity separation etc.

In order to provide for a cohydrolyzate product that can be acid equilibrated without excess silarylene cleavage occurring, experience has shown that it is critical to remove all traces of water from the cohydrolyzate including water formed by condensation of any free silanol that may be present therein. In forming the condensation product from the cohydrolyzate, therefore, the condensation of the silanol that may be present in the cohydrolyzate can be effected by forming a mixture of the cohydrolyzate and an effective amount of a base catalyst and heating the mixture to a temperature in the range of 100° C. to 250° C. while a preferred range is 130° C. to 180° C. As a practical matter however, experience has shown that if base hydrolysis has been employed to form the cohydrolyzate, enough base will be present in the cohydrolyzate to effect the condensation of silanol present therein. Cohydrolyzates formed from hydrolysis mixtures free of base, can be mixed with sufficient base catalyst so as to render the resulting mixture alkaline, preferably to a pH of at least 8. Temperatures below 100° C. can be utilized, moreover, to effect the removal of water produced by silanol condensation if the mixture is heated under reduced pressure. Suitable base catalysts that have been found operable to effect the condensation of silanol in the cohydrolyzate are alkali hydroxides such as sodium hydroxide, potassium hydroxide, lithium hydroxide, etc. The preferred catalyst is potassium hydroxide. However, other strong bases such as tetramethyl ammonium hydroxide, etc. can be employed for effective results. In the formation of the condensation product, in order to insure that the last traces of water have been separated from the cohydrolyzate, the water can be azeotroped from the cohydrolyzate with toluene or any one of the aforementioned organic solvents described above that can be employed in the hydrolysis mixture.

The condensation product can be acid equilibrated in accordance with conventional procedures without excess silarylene cleavage. Experience has shown, moreover, that if the last traces of base catalyst are removed from the condensation product such as by conventional neutralization with a mineral acid, before the condensation product is acid equilibrated, silarylene cleavage can be further minimized. Those skilled in the art would know, however, depending upon the amount of base catalyst utilized or present in the condensation product, whether neutralization of the condensation product would be desirable prior to acid equilibration.

The condensation product can be acid equilibrated with a suitable mineral acid such as sulfuric. A preferred procedure is to utilize sulfuric acid at a concentration of at least 70% while sulfuric acid at 87% concentration is preferred. In acid equilibrating the hydrolyzate, 0.001 part to as high as 0.05 part of acid catalyst can be employed per part of condensation product while a temperature in the range of between about 100° C. to as high as 150° C. has been found operable. The equilibrated product can be stripped at pot temperatures between 200° C. and 350° C. and a reduced pressure, that is, a pressure from 0.1 mm. to 100 mm. can be employed if desired.

In order that those skilled in the art will be better able to practice the invention, the following examples are given by way of illustration and not by way of limitation. All parts are by weight.

EXAMPLE 1

A mixture of 0.62 mole of bis-(p-dimethylchlorosilyl)-benzene, 0.585 mole of dimethyldichlorosilane, 0.137 mole of trimethylchlorosilane, .0675 mole of methylphenyldichlorosilane and 1.8 moles of toluene were added to a mixture of 24 moles of water and 4 moles of ammonium hydroxide while the temperature was maintained between 10 to 15° C. with an ice bath. After the addition was completed, the mixture was stirred until the formation of what appeared to be a milky oil. The aqueous layer was then separated from the resulting cohydrolyzate. A mixture of the cohydrolyzate, 11 moles of water and 0.43 mole of sodium hydroxide was heated to distill off the residual ammonia of the cohydrolyzate. The aqueous layer was then removed again, and a mixture of the oily product and potassium hydroxide where the latter was present at 0.135 percent by weight of the mixture was heated to 180° C. distilling out water and toluene. The resulting condensation product was allowed to cool and then acidified with dilute HCl and neutralized thereafter with an aqueous solution of sodium bicarbonate and sodium carbonate. The condensation product was azeotroped dry and filtered.

A portion of the above condensation product was stripped to a pot temperature of 340° C. at 3.5 mm. A product having a viscosity of 681 centistokes at 100° F. was obtained. The crystalline nature of this product was apparent because it became hazy and began to precipitate solid after 24 hours.

A mixture of 142 parts of the condensation product and 1.8 parts of sulfuric acid at 86% concentration was acid equilibrated. The mixture was heated to a temperature in the range of 120° C. to 135° C. over a period of 60 minutes. The acid layer was removed, and the final product was stripped to a pot temperature of 330° C. at a pressure of 0.4 millimeter. There was obtained 132 parts of product having a viscosity of 274 centistokes at 100° F. This product was clear and it was free of haze over an extended period of time.

EXAMPLE 2

A mixture of one mole of bis-(dimethylchlorosilyl)-benzene, .955 mole of dimethyldichlorosilane, 0.201 mole of trimethylchlorosilane, 0.067 mole of methylphenyldichlorosilane, 2.82 moles of toluene were added to 39 moles of water while the temperature of the resulting hydrolysis mixture was maintained at controlled reflux. The aqueous layer was separated, and the resulting cohydrolyzate in the form of an oil was refluxed again with 28 more moles of water. After separating the oil again from the aqueous layer, a mixture of the oil and potassium hydroxide was heated to 130° C. at 45 mm. as water and volatiles were removed. The potassium hydroxide was utilized at .067 percent by weight of the mixture. The condensation product was then cooled to 85° C. and equilibrated with 1% by weight of the condensation product of sulfuric acid at 86% concentration at a temperature between 120 to 130° C. for 45 minutes.

The acid was removed from 350 parts of the resulting product by adding an equal volume of toluene and 57 parts of a saturated sodium chloride solution. After 20 minutes, the oil was separated from the aqueous layer, dried with sodium sulfate, and filtered through fuller's earth. The filtrate was then neutralized with aqueous soda ash, dried, and then refiltered and stripped to 350° C. at 5 millimeters, resulting in the production of about 33 parts of volatiles and about 256 parts of final copolymer having a viscosity of 352 centistokes at 100° F. Volatile weight losses and infrared data showed that silarylene cleavage due to the acid equilibration of the condensation production had been minimized.

In order to illustrate the advantages achieved by the practice of the present invention with respect to the production of silarylenesiloxane copolymers, Table I below shows the results obtained by making copolymers by the method of the present invention utilizing the consecutive steps of hydrolysis, condensation and acid equilibration, as compared to the method of the prior art where the cohydrolyzate is directly acid equilibrated without an intermediate condensation step. In Table I below, various copolymer compositions are shown where "SiAr" represents silphenylenesiloxane units, "D" represents dimethyl siloxane units, "M" represents trimethylsiloxane units while "D'" represents methylphenylsiloxane units and "T" represents monomethylsiloxane units.

*Table I*

A. CONDENSATION+ACID EQUILIBRATION OF COHYDROLYZATE

| Cohydrolyzate | Mole, percent | Hydrolysis Conditions | Stripping conditions | Volatiles (Weight Losses), percent | Viscosity of Copolymer (cstk. at 100° F) |
|---|---|---|---|---|---|
| SiAr | 44.1 | 10° C. (base) | 330° C./0.4 mm | 12 | 274 |
| D | 41.3 | | | | |
| M | 9.75 | | | | |
| D' | 4.0 | | | | |
| SiAr | 45 | Reflux 95° C. | 352° C./5 mm | 11.4 | 352 |
| D | 43 | | | | |
| M | 9 | | | | |
| D' | 3 | | | | |
| SiAr | 40 | do | 352° C./5 mm | 18 | 145 |
| D | 44 | | | | |
| M | 13 | | | | |
| T | 3 | | | | |

B. DIRECT ACID EQUILIBRATION OF COHYDROLYZATE

| SiAr | 40.9 | 65° C. | 350° C./5 mm | 50 | 80.7 |
|---|---|---|---|---|---|
| D | 41.9 | | | | |
| M | 15 | | | | |
| T | 2.2 | | | | |
| SiAr | 39.7 | 65° C. | 361° C./1 mm | 54.5 | 53 |
| D | 44.5 | | | | |
| M | 14.8 | | | | |
| T | 1 | | | | |

Based on the results shown in Table I above, one skilled in the art would know that the process of the present invention provides for an improved method for the production of silarylenesiloxane copolymers. For example, by practicing the process of the present invention, copolymers can be made without a substantial amount of silarylene cleavage and consequently the copolymers can be obtained in greater yields. Acid equilibration of the cohydrolyzate, for example, without a prior condensation step, results in a production of as much as 50% or more of volatiles due to silarylene cleavage. In addition to producing undesirable weight losses due to the formation of volatiles, silarylene cleavage also results in lower copolymer viscosities as illustrated in the above table, when the cohydrolyzate was directly acid equilibrated. This result further confirms the fact that the process of the present invention minimizes the production of chain-stopping units such as shown previously in Equation 3 which would be expected to decrease the viscosity of the resulting copolymer. Considerably higher viscosities moreover, i.e., as high as 10,000 centistokes can be produced by the process of the present invention if chain-stopping units such as shown in Formulae 7 or 1 are not utilized in forming the cohydrolyzate. In applications therefore, requiring high viscosity copolymers, direct acid equilibration of the cohydrolyzate is not feasible.

While the foregoing examples have of necessity described only a few of the very many process variables which can be practiced in the present invention, it should be understood that the process of the present invention is broadly directed to the production of copolymers formed by hydrolyzing compounds of Formulae 1 and 2, condensing the resulting hydrolyzate produced thereby, and thereafter acid equilibrating the resulting condensation product.

What I claim as new and desire to secure by Letters Patent of the United States is:

1. A process for the production of copolymers composed of intercondensed silylarylenesiloxane units and organo-substituted siloxane units having a viscosity of 50 centistokes to 10,000 centistokes at 25° C. comprising (A) forming a cohydrolyzate composed of silarylenesiloxane units and organo-substituted siloxane units in a molar ratio of one mole of silylarylenesiloxane units having the formula:

$$-(R)_2SiR'Si(R)_2O-$$

0.5 to 4 moles of diorganosiloxane units having the formula:

$$(R)_2SiO$$

0 to 0.1 mole of organosiloxane units having the formula:

$$(R)SiO_{3/2}$$

and 0 to 0.5 mole of triorganosiloxane units having the formula:

$$(R)_3SiO_{1/2}$$

(B) heating to a temperature up to 250° C. a mixture of said cohydrolyzate of (A) and 0.001 to 2 percent based on the weight of said mixture of an alkali hydroxide to effect condensation, (C) acid equilibrating the product of (B), and (D) stripping the product of (C), where R is a member of the class consisting of monovalent hydrocarbon radicals and halogenated monovalent hydrocarbon radicals and R' is an arylene radical.

2. A process for the production of copolymers composed of intercondensed silylarylenesiloxane units and organo-substituted siloxane units having a viscosity of 50 centistokes to 10,000 centistokes at 25° C. comprising (A) hydrolyzing a mixture comprising a bis-(diorganohalosilyl) aromatic hydrocarbon and organohalosilanes in a molar ratio of one mole of said bis-(diorganohalosilyl) aromatic hydrocarbon having the formula:

$$X(R)_2SiR'Si(R)_2X$$

0.5 to 4 moles of a diorganodihalosilane having the formula:

$$(R)_2SiX_2$$

0 to 0.1 mole of an organohalosilane having the formula $$RSiX_3$$

and 0 to 0.5 moles of a triorganohalosilane having the formula:

$$(R)_3SiX$$

(B) heating to a temperature up to 250° C. a mixture of said cohydrolyzate of (A) and 0.001 to 2 percent based on the weight of said mixture of an alkali hydroxide to effect condensation, (C) acid equilibrating the product of (B), and (D) stripping the product of (C), where X is a halogen radical, R is a member of the class consisting of monovalent hydrocarbon radicals and halogenated monovalent hydrocarbon radicals and R' is an arylene radical.

3. A process in accordance with claim 2, where the cohydrolyzate is formed at a temperature in the range of 60 to 100° C.

4. A process in accordance with claim 2, where the cohydrolyzate is formed in a hydrolysis mixture at a pH in the range of 8 to 13.

5. A process in accordance with claim 2, where the alkali hydroxide is potassium hydroxide.

6. A process for forming a copolymer of silphenylene siloxane units and methyl siloxane units having a viscosity of 50 centistokes to 10,000 centistokes at 25° C. comprising (A) hydrolyzing a mixture comprising a bis-(dimethylchlorosilyl)benzene and methylchlorosilanes in a molar ratio of one mole of said bis-(dimethylchlorosilylbenzene), 0.5 to 4 moles of dimethyldichlorosilane, 0 to 1 mole of methylphenyldichlorosilane and 0 to 0.5 mole of trimethylchlorosilane, (B) heating to a temperature up to 250° C. a mixture of said cohydrolyzate of (A) and 0.001 to 2 percent of potassium hydroxide based on the weight of said mixture to effect condensation, (C) acid equilibrating the product of (B), and (D) stripping the product of (C.) at a temperature in the range of 200° C. to 360° C. under reduced pressure.

References Cited in the file of this patent

UNITED STATES PATENTS

| | | |
|---|---|---|
| 2,562,000 | Sveda | July 24, 1951 |
| 2,696,480 | Gordon et al. | Dec. 7, 1954 |

FOREIGN PATENTS

| | | |
|---|---|---|
| 1,246,989 | France | Oct. 17, 1960 |